United States Patent
Treml et al.

(10) Patent No.: US 9,284,956 B2
(45) Date of Patent: Mar. 15, 2016

(54) DIAPHRAGM PUMP WITH MUFFLER-MOUNTED SENSOR

(71) Applicant: Ingersoll-Rand Company, Davidson, NC (US)

(72) Inventors: Dale Treml, Charlotte, NC (US); John Conrad, Troutman, NC (US)

(73) Assignee: Ingersoll-Rand Company, Davidson, NC (US)

( * ) Notice: Subject to any disclaimer, the term of this patent is extended or adjusted under 35 U.S.C. 154(b) by 341 days.

(21) Appl. No.: 13/741,057

(22) Filed: Jan. 14, 2013

(65) Prior Publication Data

US 2014/0199188 A1    Jul. 17, 2014

(51) Int. Cl.
| | |
|---|---|
| *F04B 43/06* | (2006.01) |
| *F04B 39/00* | (2006.01) |
| *F04B 43/02* | (2006.01) |

(Continued)

(52) U.S. Cl.
CPC ............. *F04B 43/06* (2013.01); *F04B 39/0061* (2013.01); *F04B 43/026* (2013.01); *F04B 43/0736* (2013.01); *F04B 53/16* (2013.01); *F04B 53/22* (2013.01); *G01D 21/00* (2013.01); *F04B 51/00* (2013.01); *F04B 2201/0201* (2013.01); *G01D 11/30* (2013.01)

(58) Field of Classification Search
CPC ...... F04B 43/025; F04B 43/026; F04B 53/22; F04B 53/16; F04B 53/001; F04B 39/007; F04B 43/06; F04B 43/02; F04B 43/0736; F04B 2201/0201; F04B 39/0061; F04B 43/009; F04B 39/027; F04B 2203/0903; F04B 51/00; G01D 21/00; G01D 11/30; G01D 11/245; F15B 15/2807; F15B 15/2815; F16K 37/0075; F04D 15/0088

USPC ............ 417/312, 395, 63, 53, 521, 539, 540; 73/866.5, 168
See application file for complete search history.

(56) References Cited

U.S. PATENT DOCUMENTS

| | | | |
|---|---|---|---|
| 4,705,459 | A | 11/1987 | Buisine et al. |
| 4,879,440 | A | 11/1989 | Lymburner |

(Continued)

FOREIGN PATENT DOCUMENTS

| | | |
|---|---|---|
| CN | 1865702 A | 11/2006 |
| DE | 3246731 A1 | 6/1984 |

(Continued)

OTHER PUBLICATIONS

Graco, Reed Switch and Solenoid Kits 24B771 and 24B772, Aug. 2009, whole document, figure 4.*

(Continued)

*Primary Examiner* — Devon Kramer
*Assistant Examiner* — Jon Hoffmann
(74) *Attorney, Agent, or Firm* — Barnes & Thornburg LLP (57) ABSTRACT

Illustrative embodiments of diaphragm pumps including a muffler-mounted sensor are disclosed. In one illustrative embodiment, a diaphragm pump includes a shaft coupled to at least one diaphragm, an exhaust chamber configured to receive a motive fluid that has driven reciprocation of the at least one diaphragm and the shaft, a muffler disposed at least partially within the exhaust chamber, the muffler having a sensor mounting chamber defined therein, and a proximity sensor disposed in the sensor mounting chamber, a sensing end of the proximity sensor being flush with an end of the sensor mounting chamber nearest the shaft.

20 Claims, 6 Drawing Sheets

(51) Int. Cl.
*F04B 43/073* (2006.01)
*F04B 53/16* (2006.01)
*F04B 53/22* (2006.01)
*G01D 21/00* (2006.01)
G01D 11/30 (2006.01)
F04B 51/00 (2006.01)

(56) References Cited

U.S. PATENT DOCUMENTS

| | | | |
|---|---|---|---|
| 5,257,914 A | 11/1993 | Reynolds | |
| 5,816,778 A | 10/1998 | Elsey, Jr. et al. | |
| 6,168,387 B1 | 1/2001 | Able et al. | |
| 6,209,678 B1* | 4/2001 | Sterling | 181/230 |
| 6,241,487 B1* | 6/2001 | Reynolds | F04B 43/0736 137/625.6 |
| 6,280,149 B1 | 8/2001 | Able et al. | |
| 6,829,542 B1* | 12/2004 | Reynolds et al. | 702/34 |
| 6,957,952 B1 | 10/2005 | Steck et al. | |
| 7,456,385 B2 | 11/2008 | Engstrand | |
| 7,631,725 B2* | 12/2009 | Towne et al. | 181/230 |
| 7,779,962 B2* | 8/2010 | Zhang | F01N 1/163 181/226 |
| 8,628,307 B2* | 1/2014 | Lilie | F04B 39/1066 417/417 |
| 2007/0148028 A1* | 6/2007 | Lilie | F04B 39/1066 418/2 |
| 2007/0266846 A1 | 11/2007 | Simmons et al. | |
| 2007/0297926 A1 | 12/2007 | Wang et al. | |
| 2008/0302596 A1* | 12/2008 | Harrington | 181/212 |
| 2010/0196168 A1* | 8/2010 | Kozumplik et al. | 417/1 |
| 2010/0216343 A1* | 8/2010 | Buschnakowski et al. | 439/620.01 |

FOREIGN PATENT DOCUMENTS

| | | |
|---|---|---|
| DE | 20104631 U1 | 7/2001 |
| EP | 0271878 A2 | 6/1988 |
| WO | 2010088007 A1 | 8/2010 |

OTHER PUBLICATIONS

Ingersoll Rand Company Ltd, "Operator's Manual," Sep. 15, 2011, pp. 1-12.
Graco, Inc., "Reed Switch and Solenoid Kits 24B771 and 24B772," Aug. 2009, pp. 1-2.
Automation Direct, "Sensors," Oct. 2012, pp. e18-15, e18-16, vol. 14.
European Patent Office, Extended European Search Report for EP13196420, mailed Apr. 2, 2014, 6 pages.
State Intellectual Property Office, First Office Action in PRC (China) Patent Application No. 201310721934.X, Sep. 6, 2015, 13 pages. (with translation).

* cited by examiner

DIAPHRAGM PUMP WITH MUFFLER-MOUNTED SENSOR

CROSS-REFERENCE TO RELATED APPLICATIONS

Cross-reference is made to co-pending U.S. Design patent application Ser. No. 29/443,156, filed on Jan. 14, 2013, the entire disclosure of which is incorporated by reference herein.

TECHNICAL FIELD

The present disclosure relates, generally, to diaphragm pumps and, more particularly, to diaphragm pumps including a muffler-mounted sensor.

BACKGROUND

Diaphragm pumps typically include a shaft, or diaphragm rod, that moves reciprocally between end of stroke positions to cause one or more diaphragms coupled to the shaft to modify the volume of one or more associated pump chambers. A sensor may be used to detect the position and/or the movement of the shaft, such as when the shaft reaches one of the end of stroke positions. Information regarding the position and/or the movement of the shaft, obtained from the sensor, may then be utilized in controlling operation of the diaphragm pump. One such design, employing a proximity sensor, is described in U.S. Patent Application Publication No. 2010/0196168 to Kozumplik et al., the entire disclosure of which is incorporated by reference herein. Prior designs, such as that disclosed in the foregoing reference, often require a tedious assembly and adjustment procedure to achieve precise positioning of the sensor relative to the shaft.

SUMMARY

According to one aspect of the present disclosure, a diaphragm pump may include a shaft coupled to at least one diaphragm, an exhaust chamber configured to receive a motive fluid that has driven reciprocation of the at least one diaphragm and the shaft, a muffler disposed at least partially within the exhaust chamber, the muffler having a sensor mounting chamber defined therein, and a proximity sensor disposed in the sensor mounting chamber, a sensing end of the proximity sensor being flush with an end of the sensor mounting chamber nearest the shaft.

In some embodiments, the muffler may include a plurality of fins extending radially outward from a longitudinal axis of the muffler. The sensor mounting chamber may extend through each of the plurality of fins. A longitudinal axis of the sensor mounting chamber may be parallel to and spaced apart from the longitudinal axis of the muffler. The sensor mounting chamber may have a cylindrical shape.

In some embodiments, the muffler may include a plurality of protrusions extending into the sensor mounting chamber, the protrusions securing the proximity sensor within the sensor mounting chamber. The plurality of protrusions extending into the sensor mounting chamber may form an interference fit with a threading on an exterior surface of the proximity sensor.

In some embodiments, the exhaust chamber may include a longitudinal key slot configured to receive a longitudinal key of the muffler. The proximity sensor may be centered along a stroke of the shaft. The shaft may include a metallic material, and the proximity sensor may be an inductance proximity sensor.

According to another aspect, a method of mounting a proximity sensor in a diaphragm pump may include aligning a proximity sensor with a sensor mounting chamber defined in a muffler of the diaphragm pump, pressing the proximity sensor into the sensor mounting chamber until a sensing end of the proximity sensor is flush with an end of the sensor mounting chamber, and installing the muffler in an exhaust chamber of the diaphragm pump configured to receive a motive fluid that has driven the diaphragm pump, such that the sensing end of the proximity sensor is positioned a predetermined distance from a shaft of the diaphragm pump.

In some embodiments, aligning the proximity sensor with the sensor mounting chamber may include aligning a cylindrically shaped proximity sensor with a cylindrical wall of the muffler, the cylindrical wall partially bounding the sensor mounting chamber. Pressing the proximity sensor into the sensor mounting chamber may cause a plurality of protrusions extending into the sensor mounting chamber to form an interference fit with a threading on an exterior surface of the proximity sensor.

In some embodiments, installing the muffler into the exhaust chamber may include installing the muffler into the exhaust chamber such that the proximity sensor is centered along a stroke of the shaft. Installing the muffler into the exhaust chamber may include aligning a longitudinal key of the muffler with a longitudinal key slot defined in the exhaust chamber, and inserting the muffler into the exhaust chamber such that the longitudinal key slot receives the longitudinal key.

According to yet another aspect, a diaphragm pump may include a shaft coupled between two diaphragms, a muffler configured to reduce the pressure of a motive fluid that has driven reciprocation of the two diaphragms and the shaft, the muffler having a sensor mounting chamber defined therein, and a proximity sensor disposed in the sensor mounting chamber, a sensing end of the proximity sensor being flush with an end of the sensor mounting chamber nearest the shaft.

In some embodiments, the proximity sensor may be centered between the two diaphragms. The muffler may include a plurality of fins extending radially outward from a longitudinal axis of the muffler, and the sensor mounting chamber may extend through each of the plurality of fins. A longitudinal axis of the sensor mounting chamber may be parallel to and spaced apart from the longitudinal axis of the muffler. The shaft may include a metallic material and the proximity sensor is may be inductance proximity sensor.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
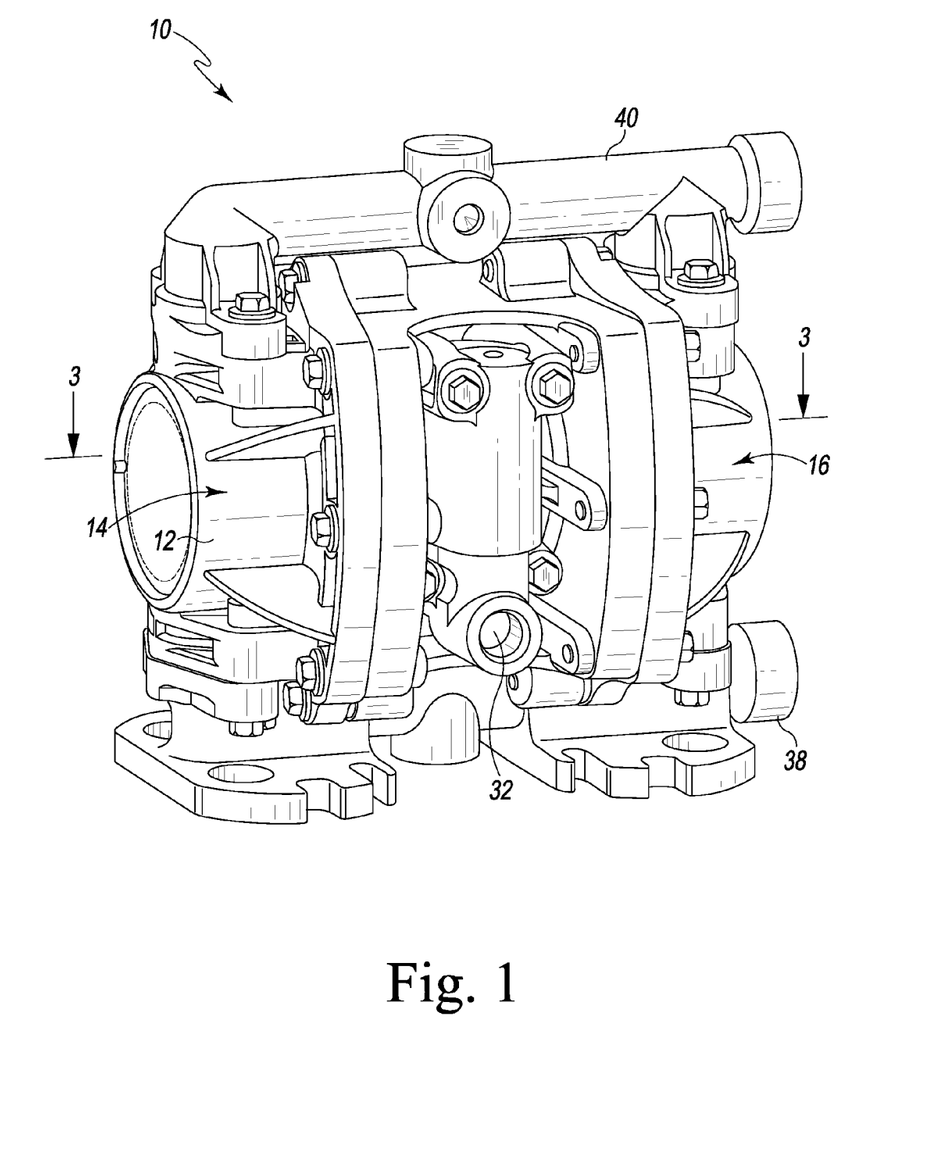
FIG. 1 is a front perspective view of at least one embodiment of a double diaphragm pump.
Figure 2:
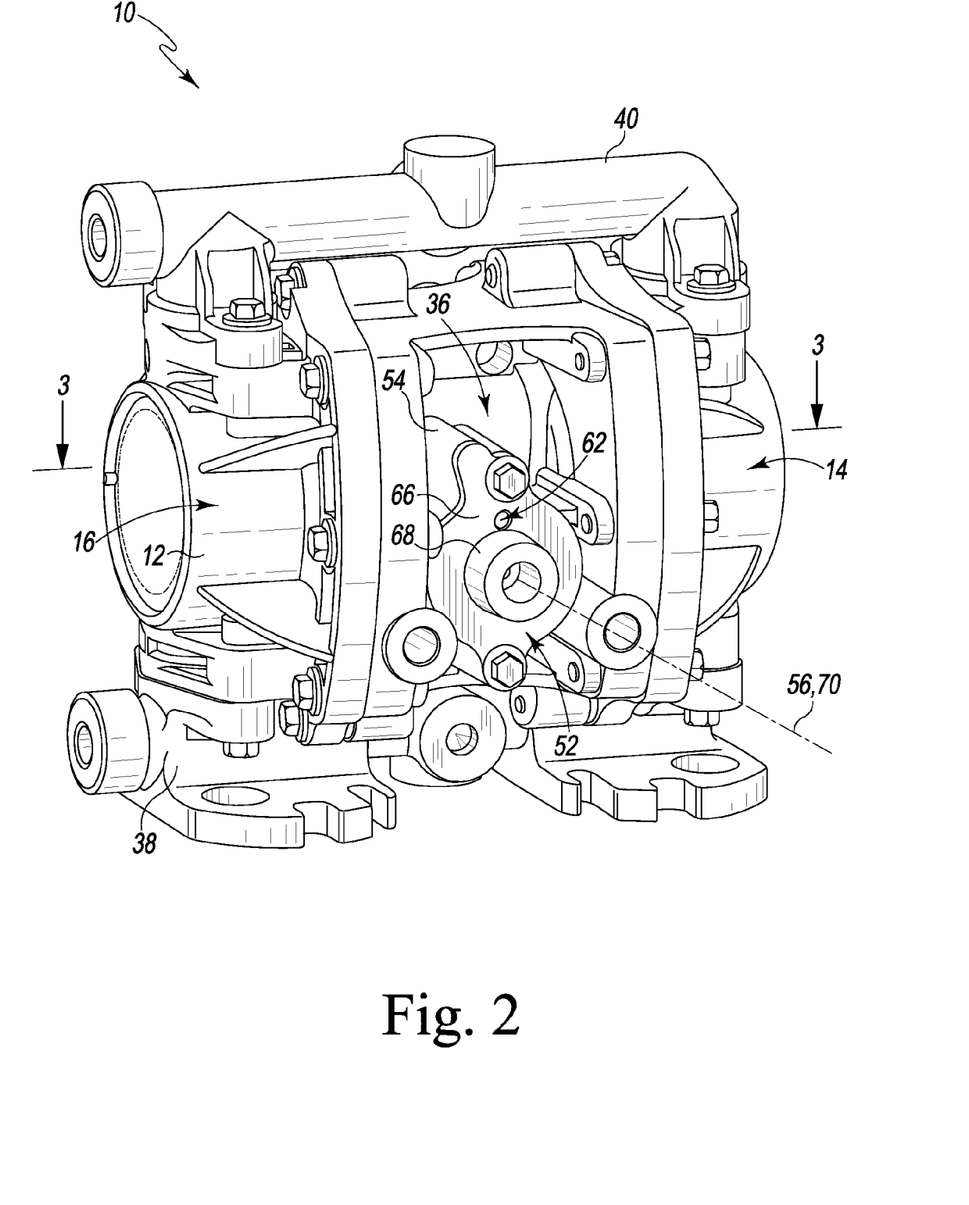
FIG. 2 is a rear perspective view of the pump of FIG. 1.
Figure 3:
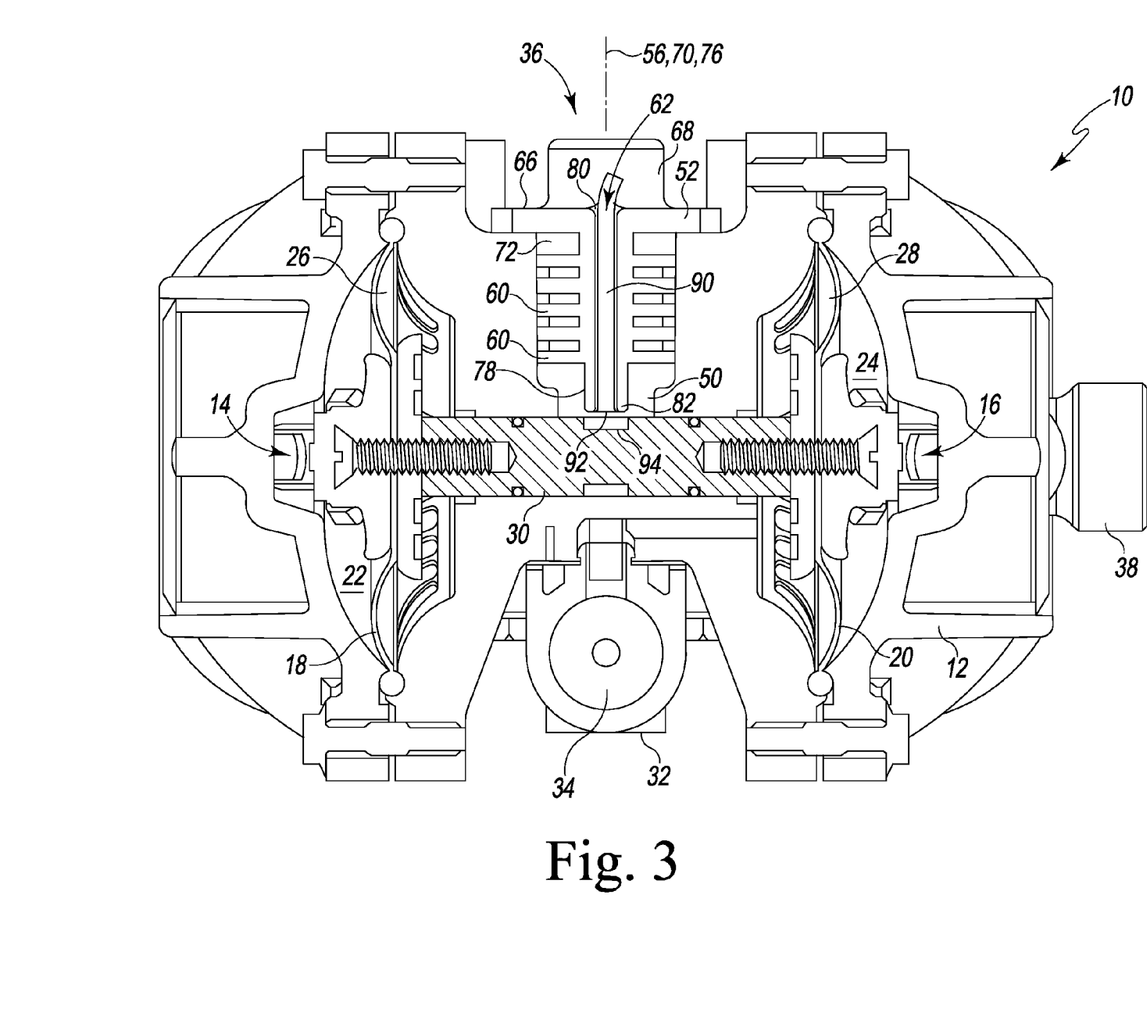
FIG. 3 is a cross-sectional view of the pump of FIGS. 1 and 2, taken along the line 3-3 in FIGS. 1 and 2.

Referring now to FIGS. 1-3, a diaphragm pump 10 is shown. The pump 10 of FIG. 1-3 is illustratively embodied as a double-diaphragm pump. It is contemplated that, in other embodiments, the pump 10 may be embodied as any other type of diaphragm pump. In the illustrative embodiment, the pump 10 has a housing 12 that defines a first working chamber 14 and a second working chamber 16. In the illustrative embodiment, the housing 12 is comprised of three sections coupled together by fasteners. As best seen in FIG. 3, the first and second working chambers 14, 16 of the pump 10 are each divided with respective first and second flexible diaphragms 18, 20 into respective first and second pump chambers 22, 24 and first and second motive fluid chambers 26, 28. The diaphragms 18, 20 are interconnected by a shaft 30, such that when the diaphragm 18 is moved to increase the volume of the associated pump chamber 22, the other diaphragm 20 is simultaneously moved to decrease the volume of the associated pump chamber 24, and vice versa.

The shaft 30 illustrated in FIG. 3 is a reciprocating diaphragm rod having a fixed length, such that the position of the shaft 30 in the pump 10 is indicative of the position of the diaphragms 18, 20. The shaft 30 and diaphragms 18, 20 move back and forth a fixed distance that defines a stroke. The fixed distance is determined by the geometry of the pump 10, the shaft 30, the diaphragms 18, 20, and other components of the pump 10 (e.g., the diaphragm washers). A stroke is defined as the travel path of the shaft 30 between first and second end of stroke positions. Movement of the shaft 30 from one end of stroke position to the other end of stroke position and back defines a cycle of operation of the shaft 30 (i.e., a cycle includes two consecutive strokes).

The pump 10 includes an inlet 32 for the supply of a motive fluid (e.g., compressed air, or another pressurized gas) and a valve 34 for alternately supplying the motive fluid to the first and second motive fluid chambers 26, 28 to drive reciprocation of the diaphragms 18, 20 and the shaft 30. When the valve 34 supplies motive fluid to the motive fluid chamber 26, the valve 34 places an exhaust assembly 36 in communication with the other motive fluid chamber 28 to permit motive fluid to be expelled therefrom. Conversely, when the valve 34 supplies motive fluid to the motive fluid chamber 28, the valve 34 places the motive fluid chamber 26 in communication with the exhaust assembly 36.

During operation of the pump 10, as the shaft 30 and the diaphragms 18, 20 reciprocate, the first and second pump chambers 22, 24 alternately expand and contract to create respective low and high pressure within the respective first and second pump chambers 22, 24. The pump chambers 22, 24 each communicate with an inlet manifold 38 that may be connected to a source fluid to be pumped and also each communicate with an outlet manifold 40 that may be connected to a receptacle for the fluid being pumped. Check valves (not shown) ensure that the fluid being pumped moves only from the inlet manifold 38 toward the outlet manifold 40. For instance, when the pump chamber 22 expands, the resulting negative pressure draws fluid from the inlet manifold 38 into the pump chamber 22. Simultaneously, the other pump chamber 24 contracts, which creates positive pressure to force fluid contained therein into the outlet manifold 40. Subsequently, as the shaft 30 and the diaphragms 18, 20 move in the opposite direction, the pump chamber 22 will contract and the pump chamber 24 will expand (forcing fluid contained in the pump chamber 24 into the outlet manifold 40 and drawing fluid from the inlet manifold 38 into the pump chamber 24).

Figure 4:
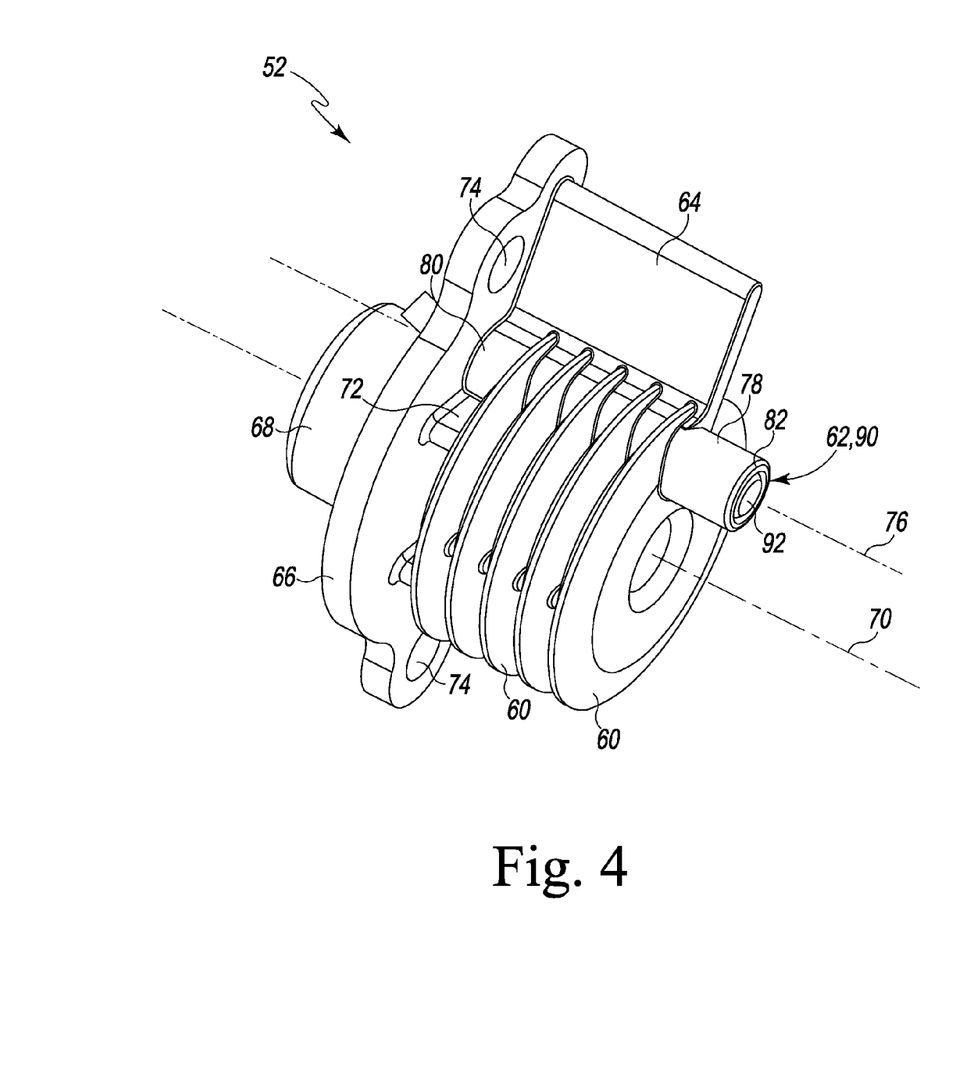
FIG. 4 is a perspective view of a muffler and a proximity sensor of the pump of FIGS. 1-3.

With reference to FIGS. 3 and 4, the exhaust assembly 36 includes an exhaust chamber 50 and a muffler 52. Except as noted below, the exhaust assembly 36 may have a design similar to the exhaust system described in U.S. Pat. No. 7,631,725 to Towne et al., the entire disclosure of which is incorporated by reference herein. In the illustrative embodiment, the exhaust chamber 50 has a generally cylindrical shape but also includes a longitudinal key slot 54 extending radially from a longitudinal axis 56 of the exhaust chamber 50. It is contemplated that the exhaust chamber 50 may be formed with various other geometries, and the generally cylindrical shape of the illustrative embodiment should not be regarded as limiting. The exhaust chamber 50 may be integrally cast with a section of the housing 12 in some embodiments, or may be separately fabricated and mounted to the housing 12 in other embodiments.

As best seen in FIG. 4, the muffler 52 includes a plurality of fins 60, a sensor mounting chamber 62, a longitudinal key 64, a flange 66, a collar 68, and a resonator stem (not shown). In the illustrative embodiments, the muffler 52 is integrally formed as one part by a process such as casting and is constructed of a substantially rigid plastic such as polypropylene. It is contemplated that, in other embodiments, the muffler 52 may be formed of another rigid material (e.g., aluminum, steel, cast iron, etc.) and may be formed by any suitable process. The fins 60 each extend radially outward from a longitudinal axis 70 of the muffler 52 (the longitudinal axis 70 being collinear with the longitudinal axis 56 of the exhaust chamber 50 when the exhaust assembly 36 is assembled). The longitudinal key 64 extends radially from the longitudinal axis 70 of the muffler 52 and across the distal ends of the fins 60. The flange 66 of the muffler 52, which is spaced from the last fin 60 by spacers 72 and by the key 64, includes a number of fastener holes 74. When the key 64 of the muffler 52 is received within the key slot 54 of the exhaust chamber 50, the fastener holes 74 of the flange 66 align with fastener holes surrounding the exhaust chamber 50 (e.g., in the housing 12) to facilitate mounting the muffler 52 to the exhaust chamber 50. Use of the key 64 and the key slot 54 ensures that the muffler 52 can only be installed within the exhaust chamber 50 in a particular orientation when the exhaust assembly 36 is assembled. In some embodiments, the collar 68 of the muffler 52 may include threading on its interior surface to facilitate connection of a conduit for receiving the exhausted motive fluid.

The sensor mounting chamber 62 of the muffler 52 extends along a longitudinal axis 76 that is parallel to, but spaced apart from, the longitudinal axis 70 of the muffler 52. As such, when the muffler 52 is installed in the exhaust chamber 50, the longitudinal axis 76 will also be parallel to and spaced apart from the longitudinal axis 56 of the exhaust chamber 50. In the illustrative embodiment, the sensor mounting chamber 62 is partially bounded by a generally cylindrical wall 78 that passes through each of the fins 60. As shown in FIG. 4, a first end 80 of the wall 78 (and, hence, the sensor mounting chamber 62) abuts the flange 66 of the muffler 52, while a second end 82 of the wall 78 (and, hence, the sensor mounting chamber 62) extends beyond the first fin 60.

Figure 5:
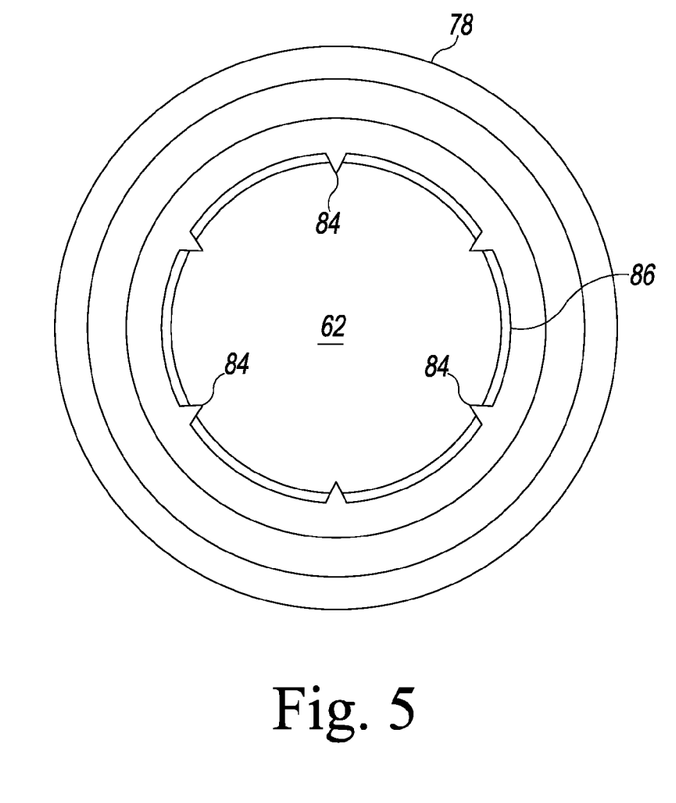
FIG. 5 is an end view of a sensor mounting chamber of the muffler of FIG. 4 (without the sensor mounted therein)

A view of the sensor mounting chamber 62 from the second end 82 is shown in FIG. 5 (without a sensor mounted therein). The sensor mounting chamber 62 has a generally circular cross-section bounded by the wall 78. In the illustrative embodiment, a number of protrusions 84 are formed on an inner surface 86 of the wall 78 and extend inwardly into the sensor mounting chamber 62. As shown in FIG. 5, the protrusions 84 each have a generally triangular shape, although it is contemplated that protrusions 84 of other shapes may be used in other embodiments. When included on the inner surface 86 of the wall 78, the protrusions 84 may assist in securing a sensor within the sensor mounting chamber 62.

As shown in FIGS. 3 and 4, a proximity sensor 90 is disposed within the sensor mounting chamber 62 of the muffler 52, such that a sensing end 92 of the proximity sensor 90 is flush with the second end 82 of sensor mounting chamber 62 (i.e., flush with the second end 82 of the wall 78). The proximity sensor 90 may be embodied as any type of device suitable for sensing the presence or absence of material (or a particular type of material) within a certain distance of the sensing end 92 of the device. In the illustrative embodiment, the proximity sensor 90 is embodied as an inductive proximity sensor 90 that detects the presence or absence of metallic material within a certain distance of its sensing end 92 (i.e., within its sensing field). One example of a suitable inductive proximity sensor 90 is part number PD1-AP-3A available from Automation Direct of Cumming, Ga. The proximity sensor 90 may have a generally cylindrical shape that corresponds to the generally cylindrical shape of the sensor mounting chamber 62. In the illustrative embodiment, the triangular protrusions 84 formed on the inner surface 86 of the wall 78 will form an interference fit with a threading on an exterior surface of the proximity sensor 90 to secure the proximity sensor 90 within the sensor mounting chamber 62 (and to maintain the sensing end 92 of the proximity sensor 90 flush with the second end 82 of the sensor mounting chamber 62).

When the muffler 52 is installed in the exhaust chamber 50, as illustrated in FIG. 3, the proximity sensor 90 disposed in the sensor mounting chamber 62 of the muffler 52 will be positioned a predetermined distance from the shaft 30 of the pump 10. Because the sensing end 92 of the proximity sensor 90 is flush with the second end 82 of the sensor mounting chamber 62 of the muffler 52, the predetermined distance between the sensing end 92 of the proximity sensor 90 and the shaft 30 of the pump 10 will be known to a high degree of precision. In addition, because the muffler 52 can only be installed within the exhaust chamber 50 in a particular orientation (due to the key 64 and the key slot 54), the proximity sensor 90 will be centered relative to the shaft 30 with a high degree of precision. This precise positioning of the proximity sensor 90 relative to the shaft 30 of the pump 10 increases the ability of the proximity sensor 90 to accurately detect the position and/or movement of the shaft 30.

The shaft 30 may include one or more features that are detectable by the proximity sensor 90 when the shaft 30 reciprocates between the first and second end of stroke positions. In the illustrative embodiment shown in FIG. 3, the shaft 30 is formed entirely of a metallic material but includes a central notch 94 where the shaft 30 has a smaller diameter. In this embodiment, the proximity sensor 90 will not be triggered when the shaft 30 is in a centered position within the pump 10 (i.e., the position shown in FIG. 3), as no metallic material is present within the sensing field of the proximity sensor 90. As the shaft 30 moves toward one of the end of stroke positions, the metallic material of a larger diameter portion of the shaft 30 will enter the sensing field of the proximity sensor 90 and trigger the proximity sensor 90. Other possible configurations for the shaft 30 that may be sensed by an inductive proximity sensor 90 are described in U.S. Patent Application Publication No. 2010/0196168 to Kozumplik et al., the entire disclosure of which is incorporated by reference herein.

Figure 6:
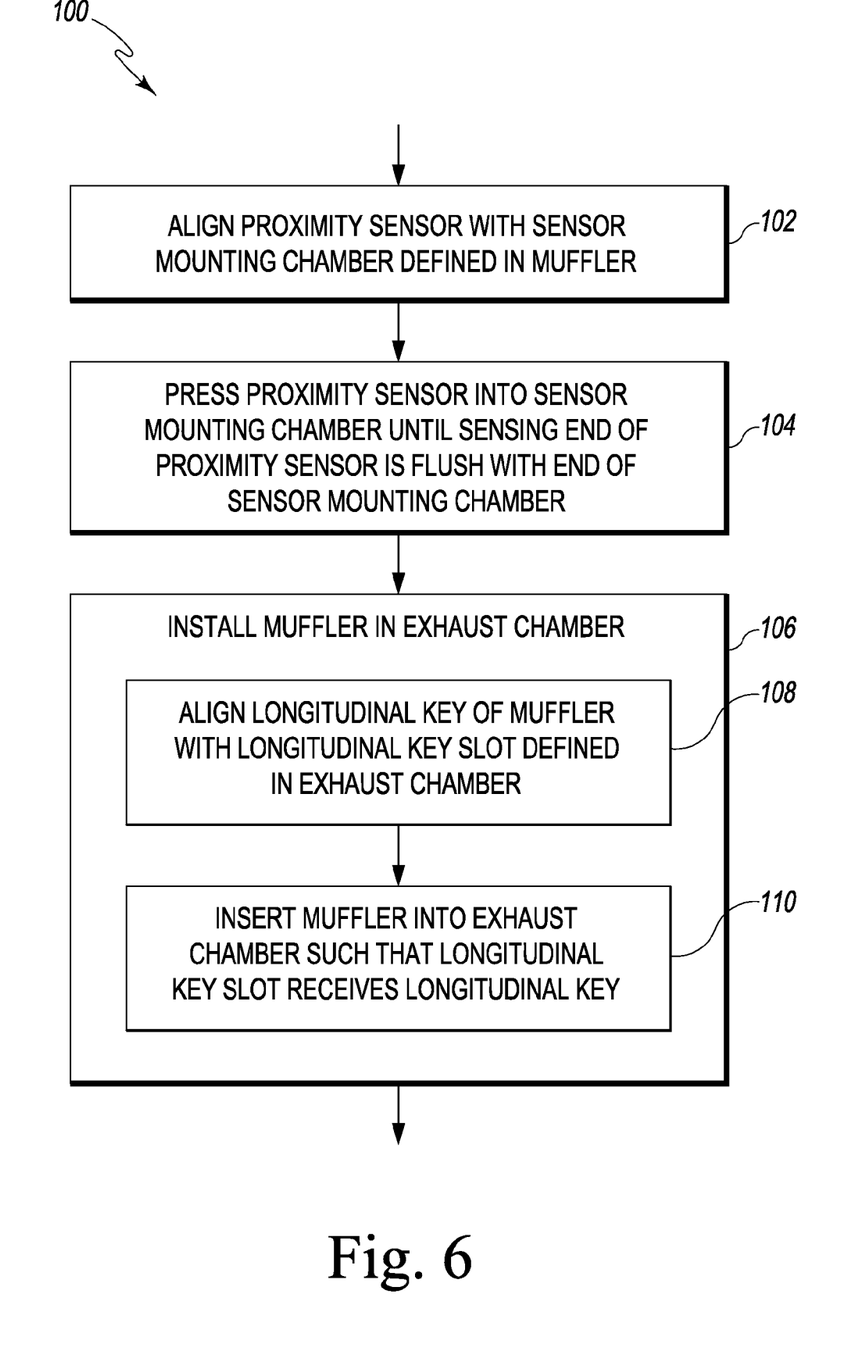
FIG. 6 is a simplified flowchart illustrating at least one embodiment of a method of mounting the proximity sensor in the pump of FIGS. 1-3.

Referring now to FIG. 6, one illustrative embodiment of a method 100 of mounting the proximity sensor 90 in the pump 10 is shown as a simplified flow diagram. For instance, the method 100 may be performed when newly assembling a pump 10 or when adding a proximity sensor 90 to an otherwise already assembled pump 10. The method 100 is illustrated as a number of blocks 102-110 in FIG. 6. It is contemplated that, in various embodiments of the method 100, each of the blocks 102-110 may be performed manually, with machine assistance, automatically by a machine, or any combination thereof.

The method 100 begins with block 102 in which the proximity sensor 90 is aligned with the sensor mounting chamber 62 defined in the muffler 52 of the pump 10. Block 102 may involve aligning the proximity sensor 90 with the longitudinal axis 76 of the sensor mounting chamber 62. In the illustrative embodiment, where the proximity sensor 90 and the sensor mounting chamber 62 are cylindrically shaped, block 102 may involve aligning an exterior surface of the proximity sensor 90 with the cylindrical wall 78 of the muffler 52. It will be appreciated that, in embodiments of the method 100 where the proximity sensor 90 is to be added to an otherwise already assembled pump 10, the muffler 52 may need to be removed from the pump 10 before block 102 is performed. This may be accomplished by removing the fasteners secured in the fastener holes 74 of the flange 66 of the muffler 52.

After block 102, the method 100 proceeds to block 104 in which the proximity sensor 90 is pressed into the sensor mounting chamber 62 until the sensing end 92 of the proximity sensor 90 is flush with the second end 82 of the sensor mounting chamber 62. As the proximity sensor 90 is inserted into the sensor mounting chamber 62, the second end 82 of the wall 78 will provide a stop for a tool being used to press the proximity sensor 90 into the sensor mounting chamber 62. Where the method 100 is performed with embodiments of the muffler 52 including the protrusions 84 extending into the sensor mounting chamber 62, block 104 may result in the protrusions 84 forming an interference fit with a threading on an exterior surface of the proximity sensor 90.

After block 104, the method 100 proceeds to block 106 in which the muffler 52 is installed in the exhaust chamber 50 of the pump 10. As described above, installation of the muffler 52 in the exhaust chamber 50 results in the sensing end 92 of the proximity sensor 90 being positioned a predetermined distance from the shaft 30 of the pump 10. In the illustrative embodiments, installation of the muffler 52 in the exhaust chamber 50 in block 106 also results in the proximity sensor 90 being centered along a stroke of the shaft 30. In some embodiments of the method 100, installing the muffler 52 in block 106 may involve performance of blocks 108 and 110. In such embodiments, block 106 includes block 108 in which the longitudinal key 64 of the muffler 52 is aligned with the longitudinal key slot 54 defined in the exhaust chamber 50. After block 108, the method 100 proceeds to block 110 in which the muffler 52 is inserted into the exhaust chamber 50 such that the longitudinal key slot 54 receives the longitudinal key 64. As described above, use of the key slot 54 and the key 64 ensures that the muffler 52 can only be installed within the exhaust chamber 50 in a particular orientation, so that the proximity sensor 90 will be centered relative to the shaft 30.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A diaphragm pump comprising:
a shaft coupled to at least one diaphragm;
an exhaust chamber configured to receive a motive fluid that has driven reciprocation of the at least one diaphragm and the shaft;
a muffler disposed at least partially within the exhaust chamber, the muffler having a sensor mounting chamber defined therein by a sensor mounting wall; and
a proximity sensor disposed in the sensor mounting chamber, the sensor mounting wall securing the proximity sensor within the sensor mounting chamber such that a sensing end of the proximity sensor is flush with an end of the sensor mounting wall nearest the shaft.

2. The diaphragm pump of claim 1, wherein the muffler comprises a plurality of fins extending radially outward from a longitudinal axis of the muffler.

3. The diaphragm pump of claim 2, wherein the sensor mounting chamber extends through each of the plurality of fins.

4. The diaphragm pump of claim 3, wherein a longitudinal axis of the sensor mounting chamber is parallel to and spaced apart from the longitudinal axis of the muffler.

5. The diaphragm pump of claim 4, wherein the sensor mounting chamber has a cylindrical shape.

6. The diaphragm pump of claim 1, wherein the sensor mounting wall of the muffler comprises a plurality of protrusions extending into the sensor mounting chamber, the protrusions securing the proximity sensor within the sensor mounting chamber.

7. The diaphragm pump of claim 6, wherein the plurality of protrusions extending into the sensor mounting chamber form an interference fit with at least a portion of an exterior surface of the proximity sensor.

8. The diaphragm pump of claim 1, wherein the exhaust chamber comprises a longitudinal key slot configured to receive a longitudinal key of the muffler.

9. The diaphragm pump of claim 1, wherein the proximity sensor is centered along a stroke of the shaft.

10. The diaphragm pump of claim 1, wherein the shaft comprises a metallic material and the proximity sensor is an inductance proximity sensor.

11. A method of mounting a proximity sensor in a diaphragm pump, the method comprising:
aligning the proximity sensor with a sensor mounting chamber defined in a muffler of the diaphragm pump by a sensor mounting wall, the sensor mounting wall being configured to secure the proximity sensor with the sensor mounting chamber;
pressing the proximity sensor into the sensor mounting chamber until a sensing end of the proximity sensor is flush with an end of the sensor mounting chamber wall configured to be positioned nearest a shaft of the diaphragm pump when the muffler is installed in the diaphragm pump; and
installing the muffler in an exhaust chamber of the diaphragm pump configured to receive a motive fluid that has driven the diaphragm pump, such that the sensing end of the proximity sensor is positioned a predetermined distance from the shaft of the diaphragm pump.

12. The method of claim 11, wherein aligning the proximity sensor with the sensor mounting chamber comprises aligning a cylindrically shaped proximity sensor with a circular cross-section of the sensor mounting wall of the muffler.

13. The method of claim 12, wherein pressing the proximity sensor into the sensor mounting chamber causes a plurality of protrusions extending into the sensor mounting chamber to form an interference fit with at least a portion of an exterior surface of the proximity sensor.

14. The method of claim 11, wherein installing the muffler into the exhaust chamber comprises installing the muffler into the exhaust chamber such that the proximity sensor is centered along a stroke of the shaft.

15. The method of claim 11, wherein installing the muffler into the exhaust chamber comprises:
aligning a longitudinal key of the muffler with a longitudinal key slot defined in the exhaust chamber; and
inserting the muffler into the exhaust chamber such that the longitudinal key slot receives the longitudinal key.

16. A diaphragm pump comprising:
a shaft coupled between two diaphragms;
a muffler configured to reduce the pressure of a motive fluid that has driven reciprocation of the two diaphragms and the shaft, the muffler having a sensor mounting chamber defined therein by a sensor mounting wall; and
a proximity sensor disposed in the sensor mounting chamber, the sensor mounting wall securing the proximity sensor within the sensor mounting chamber such that a sensing end of the proximity sensor is flush with an end of the sensor mounting wall nearest the shaft.

17. The diaphragm pump of claim 16, wherein the proximity sensor is centered between the two diaphragms.

18. The diaphragm pump of claim 16, wherein the muffler comprises a plurality of fins extending radially outward from a longitudinal axis of the muffler and the sensor mounting chamber extends through each of the plurality of fins.

19. The diaphragm pump of claim 18, wherein a longitudinal axis of the sensor mounting chamber is parallel to and spaced apart from the longitudinal axis of the muffler.

20. The diaphragm pump of claim 16, wherein the shaft comprises a metallic material and the proximity sensor is an inductance proximity sensor.

* * * * *